United States Patent
Zaifman et al.

(10) Patent No.: US 11,799,568 B2
(45) Date of Patent: Oct. 24, 2023

(54) SYSTEMS AND METHODS FOR OPTIMIZING A NETWORK BASED ON WEATHER EVENTS

(71) Applicant: Verizon Patent and Licensing Inc., Basking Ridge, NJ (US)

(72) Inventors: Art Zaifman, Millburn, NJ (US); Kirk Campbell, Long Valley, NJ (US); Srinivasa M. Kalapala, Hillsborough, NJ (US); Anil K. Guntupalli, Irving, TX (US); Ravi Sharma, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 371 days.

(21) Appl. No.: 17/247,411

(22) Filed: Dec. 10, 2020

(65) Prior Publication Data
US 2022/0190940 A1    Jun. 16, 2022

(51) Int. Cl.
*H04B 17/373* (2015.01)
*H04W 28/08* (2023.01)
*G01W 1/00* (2006.01)
*H04B 17/26* (2015.01)

(52) U.S. Cl.
CPC ............ *H04B 17/373* (2015.01); *G01W 1/00* (2013.01); *H04B 17/26* (2015.01); *H04W 28/0967* (2020.05)

(58) Field of Classification Search
CPC .. H04B 17/373; H04B 17/26; H04B 17/3913; H04W 28/0967; G01W 1/10
See application file for complete search history.

(56) References Cited

U.S. PATENT DOCUMENTS

| | | | | |
|---|---|---|---|---|
| 11,012,873 | B1* | 5/2021 | Mondragon | G06N 3/044 |
| 11,405,294 | B2* | 8/2022 | Gao | H04L 41/5009 |
| 11,436,777 | B1* | 9/2022 | Karli | G06V 30/422 |
| 2016/0281607 | A1* | 9/2016 | Asati | F02C 7/26 |
| 2018/0019910 | A1* | 1/2018 | Tsagkaris | H04W 64/006 |
| 2019/0036789 | A1* | 1/2019 | Kaplunov | H04L 41/16 |
| 2019/0243029 | A1* | 8/2019 | Lemos | G06F 17/16 |
| 2019/0311280 | A1* | 10/2019 | Rule | G06N 7/01 |
| 2019/0394659 | A1* | 12/2019 | Wang | H04W 24/04 |
| 2020/0160283 | A1* | 5/2020 | Watson | G06N 3/08 |
| 2020/0275334 | A1* | 8/2020 | Visuri | H04W 36/22 |

(Continued)

*Primary Examiner* — Redentor Pasia

(57) ABSTRACT

A device may receive historical network behavior data associated with a network that includes network devices and may receive historical weather data associated with a geographical location of the network. The device may receive historical action data identifying historical actions taken for the network in response to the historical weather data, and may train a correlation model, with the historical network behavior data, the historical weather data, and the historical action data, to generate a trained correlation model. The device may receive a weather event forecast associated with the geographical location, and may process the weather event forecast, with the trained correlation model, to determine an anticipated behavior of the network in response to the weather event forecast. The device may process data identifying the anticipated behavior, with the trained correlation model, to identify actions to take in response to the anticipated behavior and may perform the actions.

20 Claims, 9 Drawing Sheets

(56) References Cited

U.S. PATENT DOCUMENTS

| | | | | |
|---|---|---|---|---|
| 2020/0322814 | A1* | 10/2020 | Tofighbakhsh | H04W 24/02 |
| 2020/0410355 | A1* | 12/2020 | Zhu | G06F 18/23 |
| 2021/0256378 | A1* | 8/2021 | Watt | G06N 3/044 |
| 2021/0286105 | A1* | 9/2021 | Gaitan Ospina | G01W 1/10 |
| 2021/0314789 | A1* | 10/2021 | Malboubi | G06N 3/045 |
| 2021/0406041 | A1* | 12/2021 | Saraiya | G06F 3/04847 |
| 2022/0077923 | A1* | 3/2022 | Barritt | G08G 5/0026 |
| 2022/0114491 | A1* | 4/2022 | Kelly | G06N 3/044 |
| 2022/0121882 | A1* | 4/2022 | Carufel | G06N 3/006 |
| 2022/0131747 | A1* | 4/2022 | Sevindik | H04W 72/569 |
| 2022/0150132 | A1* | 5/2022 | Mara | H04L 41/16 |
| 2022/0256394 | A1* | 8/2022 | Briggs | H04L 65/403 |
| 2023/0072769 | A1* | 3/2023 | Yeh | H04W 28/0858 |

\* cited by examiner

US 11,799,568 B2

SYSTEMS AND METHODS FOR OPTIMIZING A NETWORK BASED ON WEATHER EVENTS

BACKGROUND

Weather events (e.g., tropical storms, hurricanes, tornados, blizzards, high winds, lightning, and/or the like) may cause power outages, downed utility poles, failed communication equipment, etc., in a geographical location. Many consumers in the geographical location, subject to extreme weather events, may utilize Internet service provider (ISP) routers to access both voice and data networks (e.g., the Internet), but weather events that cause problems, such as power outages, may prevent access to such ISP routers and the respective networks.

DETAILED DESCRIPTION OF PREFERRED EMBODIMENTS

Figure 1A:
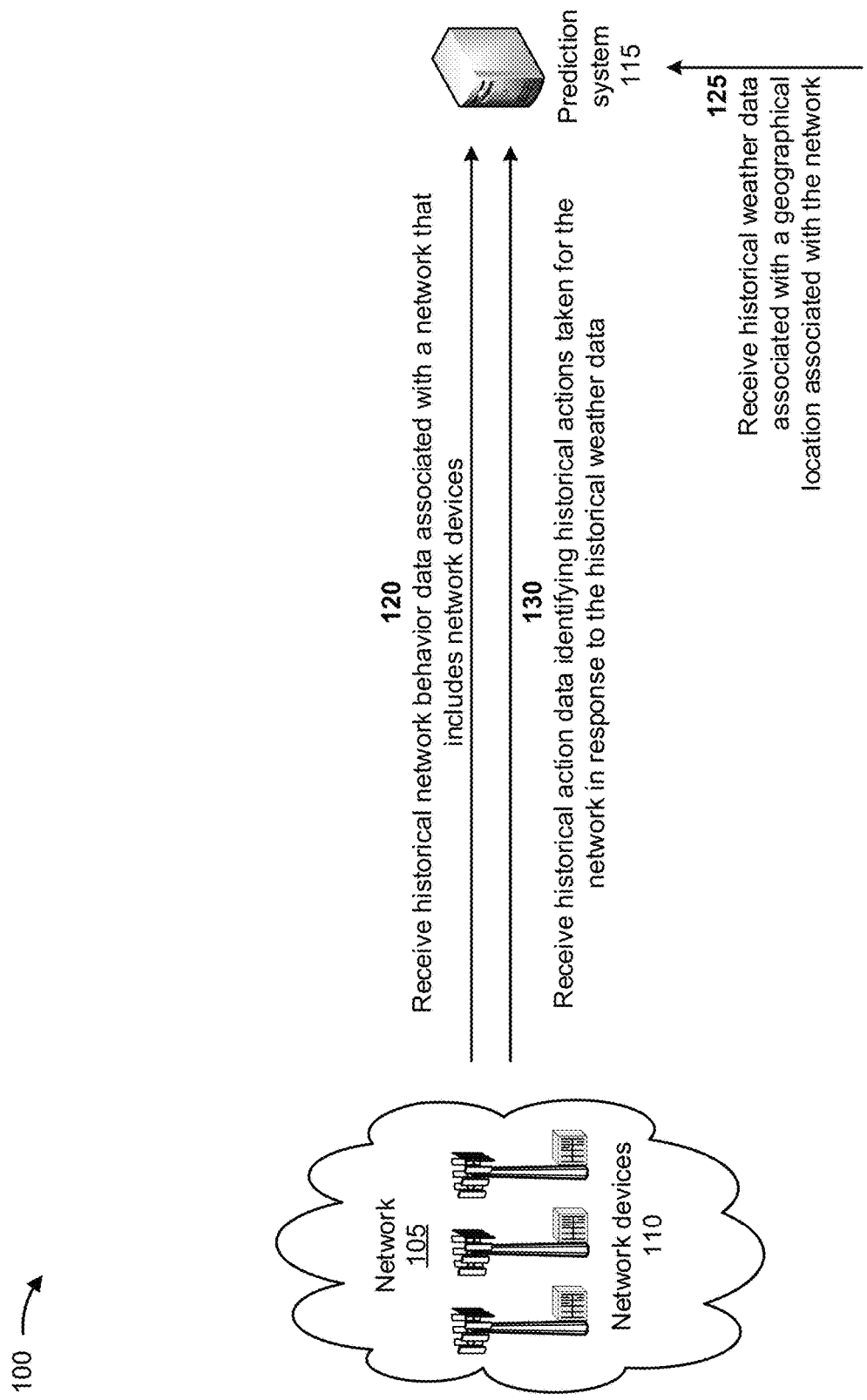
FIGS. 1A-1E are diagrams of an example associated with utilizing a machine learning model to predict network behavior based on weather events.

The following detailed description of example implementations refers to the accompanying drawings. The same reference numbers in different drawings may identify the same or similar elements.

When a power outage occurs in a geographical location due to a weather event, consumers utilizing ISP routers may lose power and connectivity with the data network that relies on a power grid for service. As a result of the power loss, consumers may then be forced to utilize a cellular network (e.g., a long term evolution (LTE) or fourth generation (4G) network, a fifth generation (5G) network, and/or the like) to connect to the data network. During the power outage period, a cellular network provider may experience a dramatic increase in traffic volume based on a time of day and/or a day of a week associated with the power outage, consumer density in the geographical location, a duration of the power outage, and/or the like. The dramatic increase in traffic volume may cause a rapid increase in network latency, capacity, etc., which may lead to degraded network performance. Thus, current techniques for handling increased network utilization during a power outage may waste computing resources (e.g., processing resources, memory resources, communication resources, and/or the like), networking resources, human resources, and/or the like associated with the network operating inefficiently, identifying network resources to allocate for the increased network utilization, handling consumer complaints associated with the network, and/or the like.

Some implementations described herein provide a system that utilizes a machine learning model to predict network behavior based on weather events. For example, the system may receive historical network behavior data associated with a network that includes network devices and may receive historical weather data associated with a geographical location associated with the network. The system may receive historical action data identifying historical actions taken for the network in response to the historical weather data, and may train a correlation model, with the historical network behavior data, the historical weather data, and the historical action data, to generate a trained correlation model. The system may receive a weather event forecast associated with the geographical location and may process the weather event forecast, with the trained correlation model, to determine an anticipated behavior of the network in response to the weather event forecast. The system may process data identifying the anticipated behavior of the network, with the trained correlation model, to identify one or more actions to take in response to the anticipated behavior and may perform the one or more actions.

In this way, the system utilizes a machine learning model to predict network behavior based on weather events. The system may receive historical network behavior data identifying behaviors of a network during power outages and historical weather data identifying weather that causes the power outages. The system may train the machine learning model based on the historical network behavior data and the historical weather data. The system may utilize the trained machine learning model to predict power outages and network behavior based on weather event forecasts. The system may determine one or more actions to perform with the network when a power outage is predicted. Thus, the system conserves computing resources, networking resources, human resources, and/or the like associated with the network operating inefficiently, identifying network resources to allocate for the increased network utilization, handling consumer complaints associated with the network, and/or the like.

FIGS. 1A-1E are diagrams of an example 100 associated with utilizing a machine learning model to predict network behavior based on weather events. As shown in FIGS. 1A-1E, example 100 includes a network 105, network devices 110 within network 105, and a prediction system 115. Network 105 may include a radio access network (RAN) associated with an LTE or 4G network, a 5G network, and/or the like. Each network device 110 may include an eNodeB (eNB) capable of transferring traffic, such as audio, video, text, and/or other traffic associated with network 105, a gNodeB (gNB) that supports, for example, a cellular radio access technology (RAT) and wireless communication for network 105, and/or the like. Prediction system 115 may include a system that utilizes a machine learning model to predict network behavior based on weather events. Prediction system 115 may be included within network 105 or may be separate from network 105.

As shown in FIG. 1A, and by reference number 120, prediction system 115 may receive historical network behavior data associated with network 105 that includes network devices 110. The historical network behavior data may include historical data identifying bandwidth utilizations by network 105, capacity of network 105, transport latencies associated with network 105, packet latencies associated with network 105, packet jitters associated with network 105, capacities of network devices 110, bandwidth utilizations of network devices 110, user behavior associated with network 105 during a power outage, customer issues identified based on the user behavior, and/or the like. Prediction system 115 may receive the historical network behavior data and may store the historical network behavior data in a data structure (e.g., a database, a table, a list, and/or the like) associated with prediction system 115. In some implementations, prediction system 115 provides, to network 105 and/or network devices 110, a request for the historical network behavior data, and receives the historical network behavior data from network 105 and/or network devices 110 based on the request. In some implementations, prediction system 115 periodically receives the historical network behavior data, continuously receives the historical network behavior data, and/or the like.

As further shown in FIG. 1A, and by reference number 125, prediction system 115 may receive historical weather data associated with a geographical location associated with network 105. The historical weather data may correspond with a same or similar time period associated with the historical network behavior data. The historical weather data may include data associated with the geographical location, wind speeds and directions associated with the geographical location, precipitation amounts associated with the geographical location, lightning strikes associated with the geographical location, a storm (e.g., a hurricane, a tornado, a snowstorm, an ice storm, and/or the like) associated with the geographical location, and/or the like. Prediction system 115 may receive the historical weather data and may store the historical weather data in the data structure associated with prediction system 115. In some implementations, prediction system 115 provides, to a device associated with a weather service for the geographical location, a request for the historical weather data, and receives the historical weather data from the device associated with the weather service based on the request. In some implementations, prediction system 115 periodically receives the historical weather data, continuously receives the historical weather data, and/or the like.

As further shown in FIG. 1A, and by reference number 130, prediction system 115 may receive historical action data identifying historical actions taken for network 105 in response to the historical weather data. The historical action data may include data identifying adjustments to parameters associated with network 105 and/or network devices 110 based on the historical weather data, capacity requirement upgrades made to network 105 and/or network devices 110 based on the historical weather data, additional network devices 110 added to network based on the historical weather data, and/or the like. Prediction system 115 may receive the historical action data and may store the historical action data in the data structure associated with prediction system 115. In some implementations, prediction system 115 provides, to network 105 and/or network devices 110, a request for the historical action data, and receives the historical action data from network 105 and/or network devices 110 based on the request. In some implementations, prediction system 115 periodically receives the historical action data, continuously receives the historical action data, and/or the like.

Figure 1B:
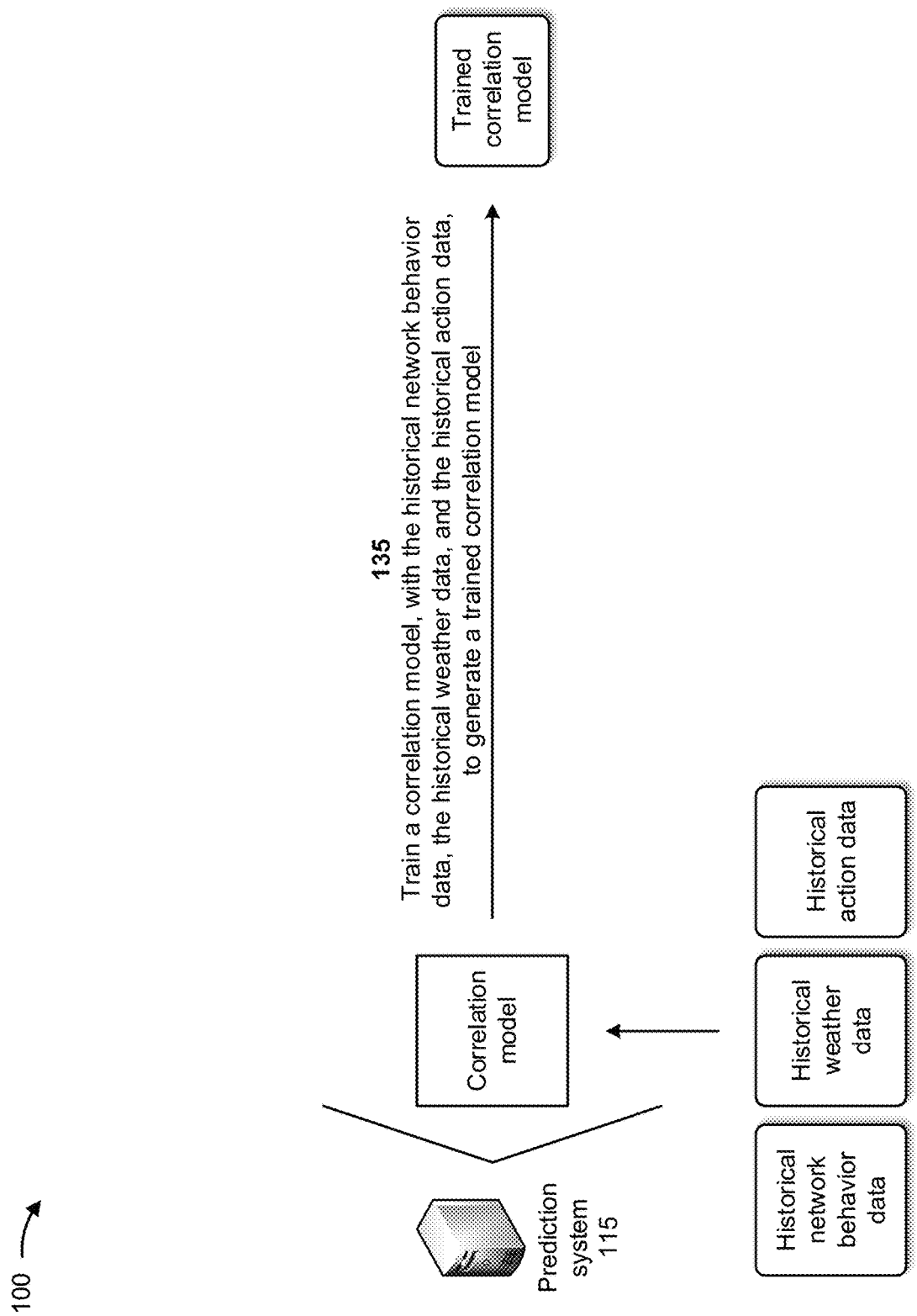

As shown in FIG. 1B, and by reference number 135, prediction system 115 may train a correlation model, with the historical network behavior data (e.g., user behavior associated with network 105 during a power outage and not during a power outage, customer issues identified based on the user behavior, and/or the like), the historical weather data, and the historical action data, to generate a trained correlation model. The correlation model may include a machine learning model, such as a deep learning model. In some implementations, prediction system 115 trains the correlation model to predict power outages for the geographical location based on the historical weather data, anticipated behaviors of network 105 (e.g., low bandwidths of network 105, high utilization of network 105, low capacities of network 105, and/or the like) based on the predicted power outages, responses to the predicted power outages based on the predicted anticipated behaviors of network 105, and/or the like. In some implementations, the correlation model may be trained by another device and received by prediction system 115 from the other device. For example, prediction system 115 may provide the historical network behavior data, the historical weather data, and the historical action data to the other device, and the other device may train the correlation model based on the historical network behavior data, the historical weather data, and the historical action data, to generate the trained correlation model. The other device may then provide the trained correlation model to prediction system 115. Further details of training the correlation model are described below in connection with FIG. 2.

Figure 1C:
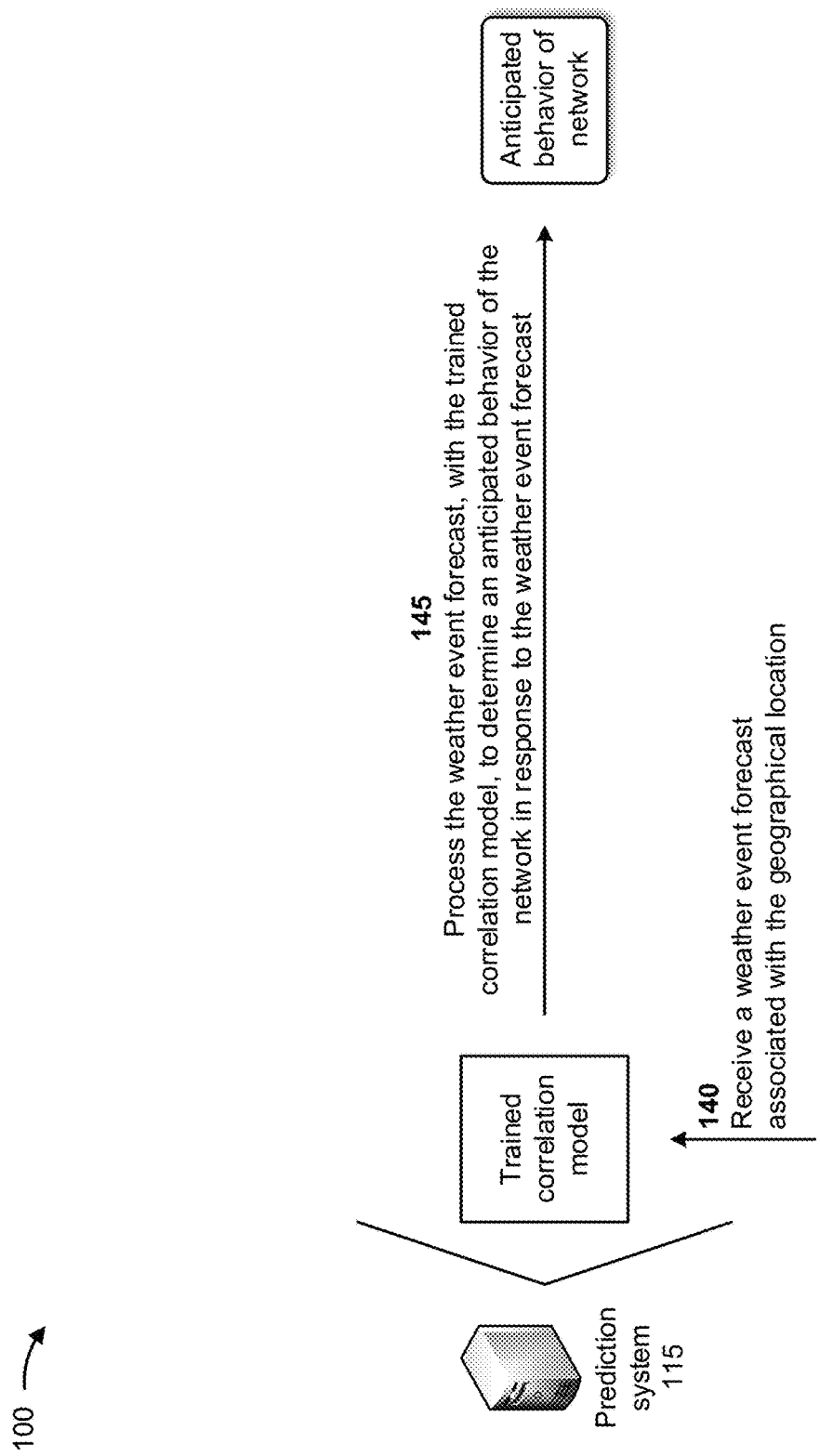

As shown in FIG. 1C, and by reference number 140, prediction system 115 may receive a weather event forecast associated with the geographical location. The weather event forecast may include multi-day forecasts of weather (e.g., radar, wind speeds and directions, precipitation amounts, lightning strikes, storms, and/or the like) associated with the geographical location. In some implementations, prediction system 115 receives the weather event forecast from the device associated with the weather service for the geographical location.

As further shown in FIG. 1C, and by reference number 145, prediction system 115 may process the weather event forecast, with the trained correlation model, to determine an anticipated behavior of network 105 in response to the weather event forecast. The anticipated behavior of network 105 may include increased utilization of network 105, reduced capacity of network 105, increased transport latency associated with network 105, increased packet latency associated with network 105, increased packet jitter associated with network 105, reduced capacities of network devices 110, increased bandwidth utilizations of network devices 110, and/or the like.

In some implementations, the trained correlation model may determine that the anticipated behavior of network 105 is associated with a power outage for the geographical location when the anticipated behavior of network 105 satisfies a threshold (e.g., a threshold utilization of network 105, a threshold capacity of network 105, a threshold transport latency associated with network 105, a threshold packet latency associated with network 105, packet jitter associated with network 105, threshold capacities of network devices 110, threshold bandwidth utilizations of network devices 110, and/or the like). For example, the trained correlation model may distinguish rapid rises in utilization of network 105 caused by faulty equipment or other anomalies from rapid rises in utilization of network 105 caused by actual power failures. The trained correlation model may determine that the anticipated behavior of network 105 is not associated with a power outage for the geographical location when the anticipated behavior of network 105 fails to satisfy the threshold. For example, the trained correlation model may determine that specific heavy weather events (e.g., wind speeds greater than fifty miles per hour, multiple lightning strikes per minute, and/or the like), within the geographical location, cause above-normal activity and stress within network 105, such as increased utilization of bandwidth of network 105, increased transport latencies of network 105, and/or the like.

In some implementations, the trained correlation model may determine that the anticipated behavior of network 105 is associated with a power outage for the geographical location and analyze network utilization data associated with one or more other networks geographically located proximate to network 105. The trained correlation model may determine an extent of the power outage based on analyzing the network utilization data and may determine the anticipated behavior of network 105 based on the extent of the power outage.

Figure 1D:
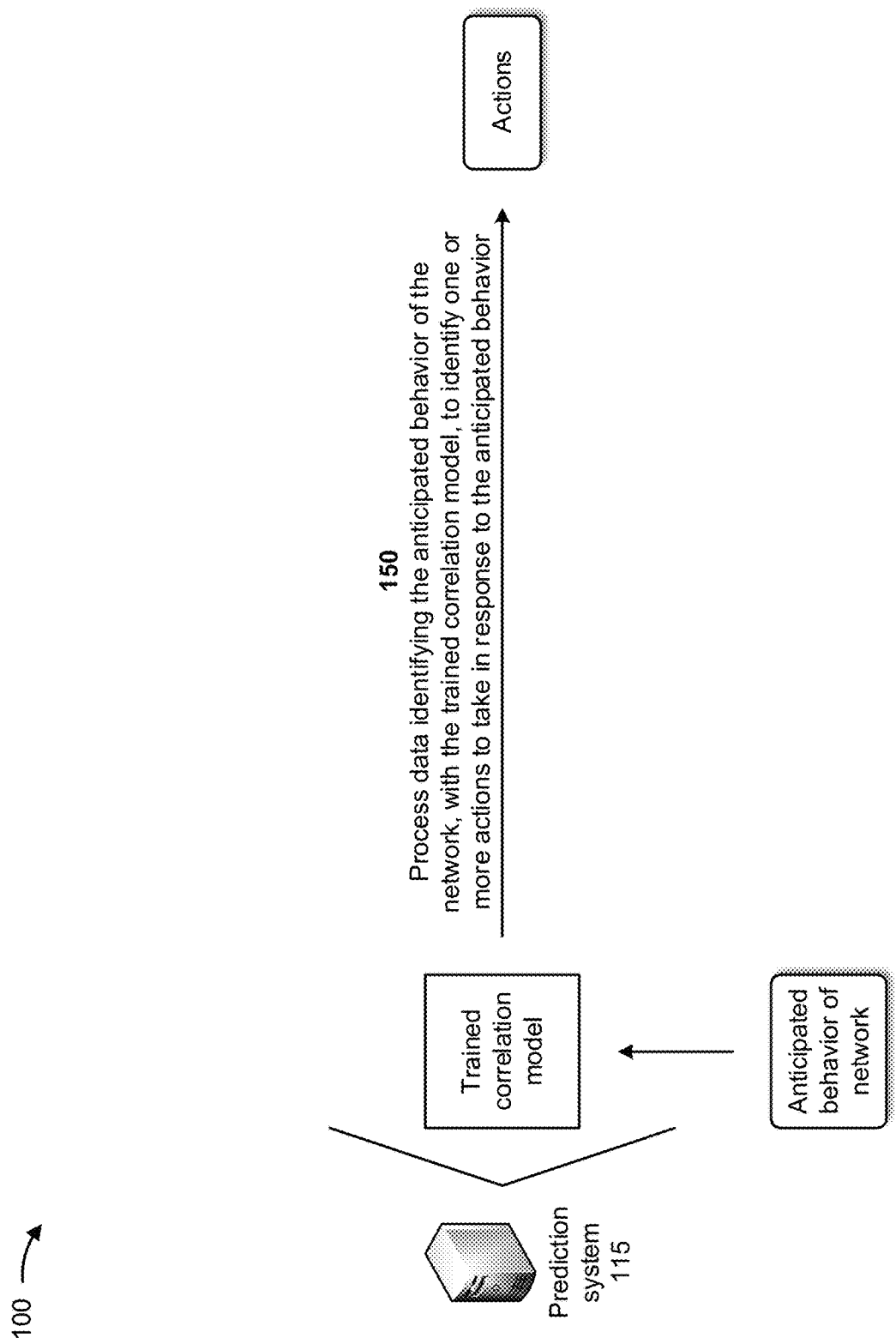

As shown in FIG. 1D, and by reference number 150, prediction system 115 may process data identifying the anticipated behavior of network 105, with the trained correlation model, to identify one or more actions to take in response to the anticipated behavior. The one or more actions may include actions to increase bandwidth of network 105, increase capacity of network 105, decrease transport latency associated with network 105, decrease packet latency associated with network 105, decrease packet jitter associated with network 105, increase capacities of network devices 110, increase bandwidths of network devices 110, and/or the like. For example, the one or more actions may include prediction system 115 causing one or more additional network devices 110 to be temporarily allocated for the geographical location; causing an autonomous vehicle with a network device 110 to be dispatched to the geographical location; providing a notification about the anticipated behavior to users of network 105 located in the geographical location; causing an order to be placed for a new network device 110, adjusting one or more parameters of one or more of network devices 110 based on the anticipated behavior; implement an upgrade to network 105; and/or the like. Further details of the one or more actions are described below in connection with FIG. 1E.

Figure 1E:
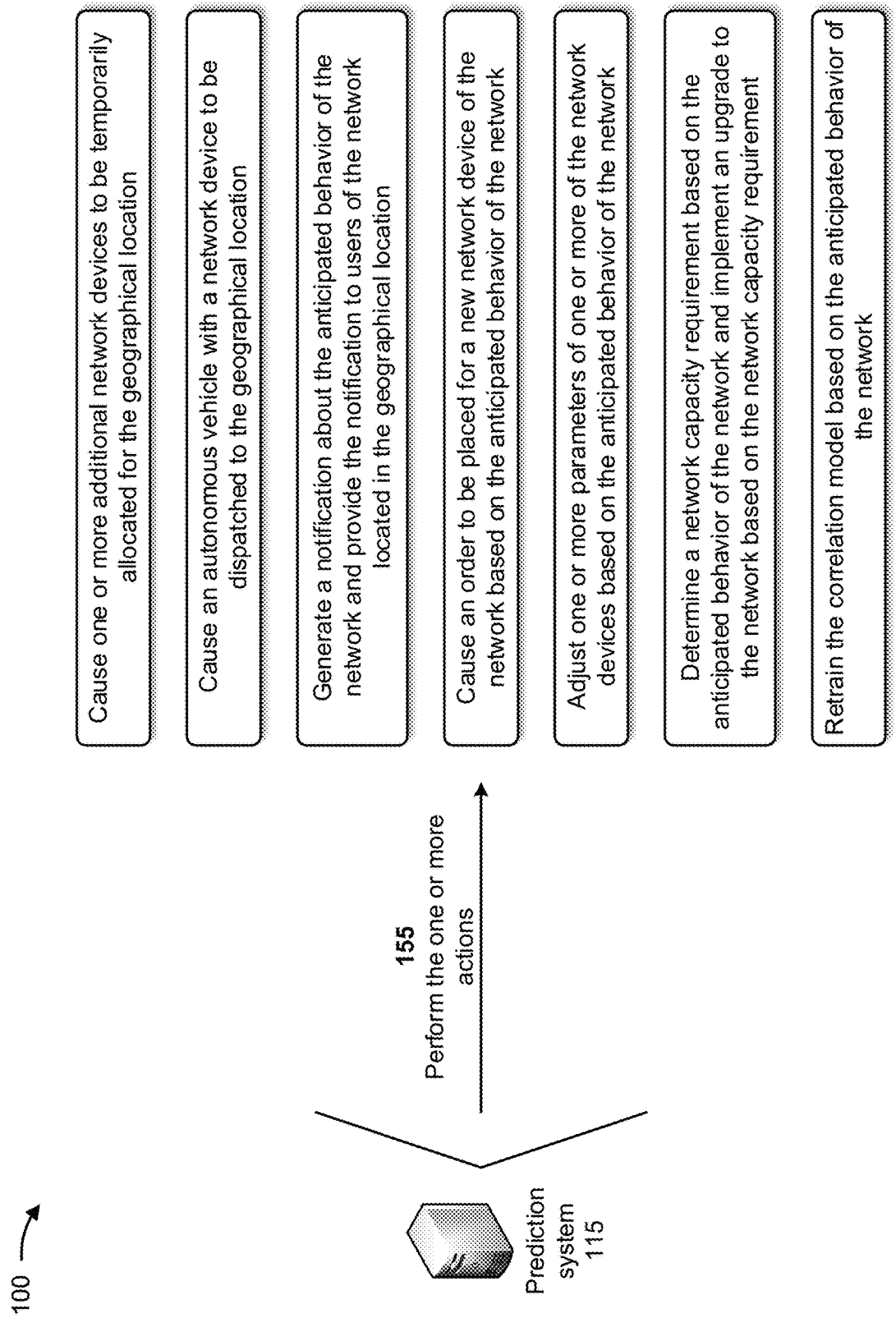

As shown in FIG. 1E, and by reference number 155, prediction system 115 may perform the one or more actions. In some implementations, performing the one or more actions includes prediction system 115 causing one or more additional network devices 110 to be temporarily allocated for the geographical location. For example, prediction system 115 may cause additional network devices 110, associated with other networks proximate to the geographical location, to be temporarily allocated for the geographical location. In this way, network 105 and the one or more additional network devices 110 may handle an increase in bandwidth utilization of network 105, a decrease in capacity of network 105, and/or the like. This may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 causing an autonomous vehicle (e.g., a robot, an unmanned aerial vehicle, an autonomous car, an autonomous truck, and/or the like) equipped with a network device 110 (e.g., an eNodeB, a gNodeB, and/or the like) to be dispatched to the geographical location. Network device 110 of the autonomous vehicle may provide additional service to users in the geographical location. In this way, network 105 and the network device 110 of autonomous vehicle may handle an increase in bandwidth utilization of network 105, a decrease in capacity of network 105, and/or the like. This may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 generating a notification (e.g., a text message, an email message, an alert message, an automated telephone call, and/or the like) about the anticipated behavior of network 105 and providing the notification to users of network 105 located in the geographical location. In this way, the users of network 105 may be notified about an increase in bandwidth utilization of network 105, a decrease in capacity of network 105, and/or the like. This may conserve computing resources, networking resources, human resources, and/or the like associated with handling consumer complaints associated with network 105.

In some implementations, performing the one or more actions includes prediction system 115 causing an order to be placed for a new network device 110 of network 105 based on the anticipated behavior of the network. For example, prediction system 115 may determine that at least one additional network device 110 is needed whenever a power outage occurs in the geographical location. Thus, prediction system 115 may order the new network device 110 for network 105 in order to handle network demands associated with future power outages. In this way, network 105 and the new network device 110 may handle an increase in bandwidth utilization of network 105, a decrease in capacity of network 105, and/or the like associated with future power outages. This may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 adjusting one or more parameters of one or more of network devices 110 based on the anticipated behavior of network 105. For example, prediction system 115 may adjust parameters of the one or more network devices 110 (e.g., a tilt angle of a base station, a power of a signal generated by a base station, and/or the like) so that the one or more network devices 110 may handle an increase in bandwidth utilization of network 105, a decrease in capacity of network 105, and/or the like. This, in turn, may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 determining a network capacity requirement based on the anticipated behavior of network 105 and implementing an upgrade to network 105 based on the network capacity requirement. For example, prediction system 115 may determine that at least one additional network device 110 is needed whenever a power outage occurs in the geographical location based on a network capacity requirement of network 105 during the power outage. Thus, prediction system 115 may cause a new network device 110 to be provided for network 105 to handle the network capacity requirement of network 105 during power outages. This may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 retraining the correlation model based on the anticipated behavior of network 105. Prediction system 115 may utilize the anticipated behavior of network 105 as additional training data for retraining the correlation model, thereby increasing the quantity of training data available for training the correlation model. Accordingly, prediction system 115 may conserve computing resources associated with identifying, obtaining, and/or generating historical data for training the correlation model relative to other systems for identifying, obtaining, and/or generating historical data for training machine learning models.

In some implementations, performing the one or more actions includes prediction system 115 prioritizing of select customers within the geographical location of the power outage. For example, the select customers may pay for premium latency sensitive services from network 105, and prediction system 115 may ensure that the select customers are allocated resources of network 105 for the premium latency sensitive services (e.g., during a power outage) before other customers that did not pay for the premium latency sensitive services. The latency sensitive services may be defined by service level agreements (SLAs) between the select customers and a carrier and may include requirements associated with a power outage in the geographical location. The requirements may include improving qualities of service for the select customers by updating, reconfiguring, provisioning, and/or the like network devices 110 located geographical location; activating network devices 110 that are dormant until a power outage occurs and which are provisioned to only accept network traffic from the select customers; and/or the like. In this way, the select customers may still be provided the premium latency sensitive services even during a power outage, which may conserve computing resources, networking resources, human resources, and/or the like for handling consumer complaints associated with network 105.

In some implementations, performing the one or more actions includes prediction system 115 determining a power outage signature based on the anticipated behavior of network 105, and utilizing the power outage signature as another alarm or alert mechanism in case power supply alarms of network devices 110 fail to trigger during a power outage. For example, network devices 110 typically generate alarms which may be received and reported by monitoring systems of network 105 when power outages occur. These alarms may fail to be detected by the monitoring systems due to hardware issues associated with network devices 110, software issues associated with the monitoring systems, and/or the like. Prediction system 115 may serve as a backup power outage alarm (e.g., a logical and virtual power failure detector) since prediction system 115 may learn to detect power outage conditions and a scope or geographic area of the power outage. This may conserve computing resources, networking resources, human resources, and/or the like associated with network 105 operating inefficiently, identifying network resources to allocate for the increased network utilization, handling consumer complaints associated with network 105, and/or the like.

In some implementations, performing the one or more actions includes prediction system 115 determining usage patterns associated with network 105 during a power outage in the geographical location, and modifying network 105 based on the usage patterns. For example, prediction system 115 may determine that a portion of network 105 requires an additional network device 110 based on the usage patterns of network 105 during a power outage. Prediction system 115 may cause a new network device 110 to be allocated for the portion of network 105. This may conserve computing resources, networking resources, human resources, and/or the like associated with network 105 operating inefficiently, identifying network resources to allocate for the increased network utilization, handling consumer complaints associated with network 105, and/or the like.

In this way, prediction system 115 utilizes a machine learning model to predict network behavior based on weather events. Prediction system 115 may receive historical network behavior data identifying behaviors of network 105 during power outages, and historical weather data identifying weather that causes the power outages. Prediction system 115 may train the machine learning model based on the historical network behavior data and the historical weather data and may utilize the trained machine learning model to predict power outages and network behavior based on weather event forecasts. Prediction system 115 may determine one or more actions to perform with network 105 when a power outage is predicted. Thus, prediction system 115 conserves computing resources, networking resources, human resources, and/or the like associated with network 105 operating inefficiently, identifying network resources to allocate for the increased network utilization, handling consumer complaints associated with network 105, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
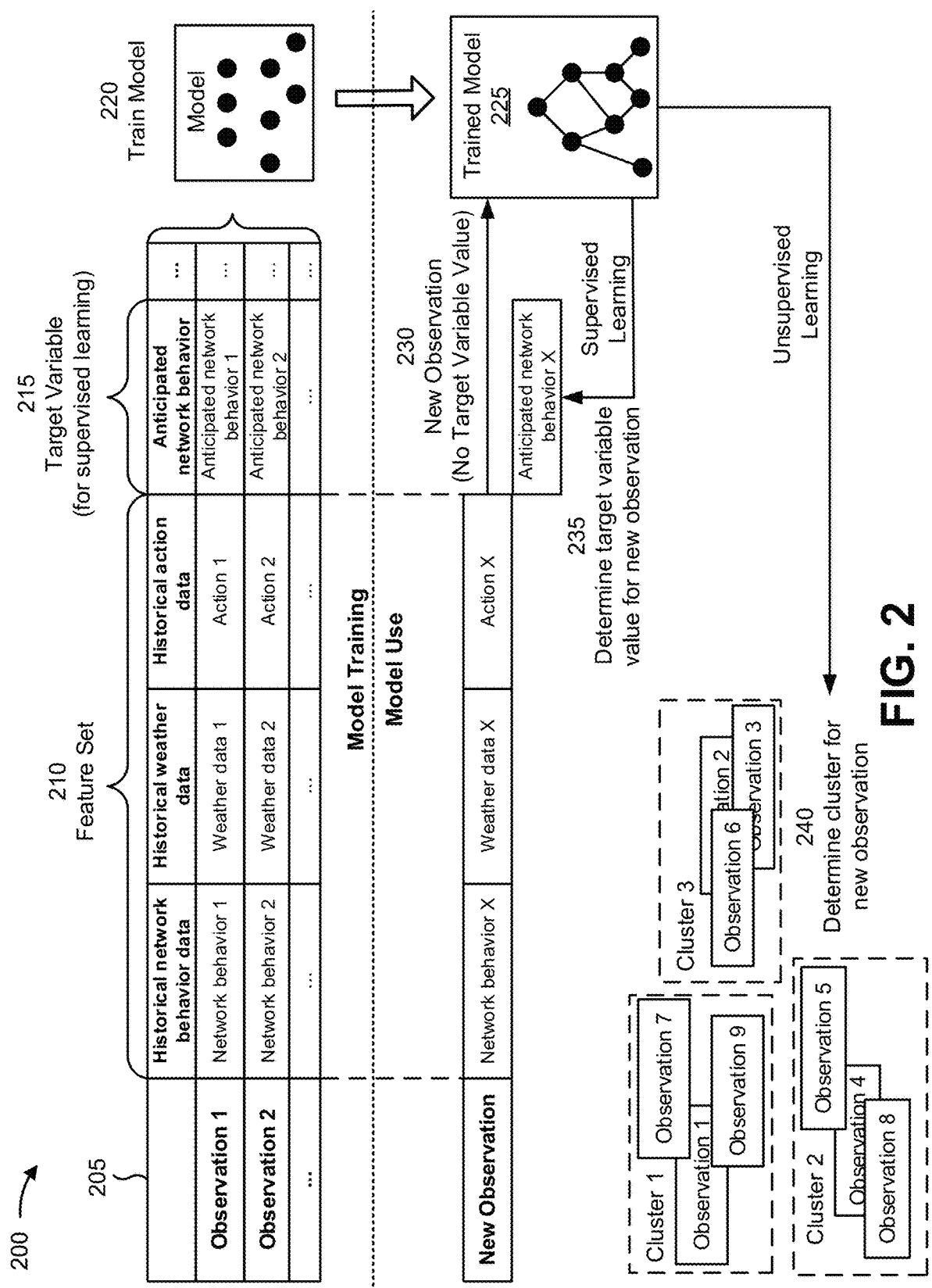
FIG. 2 is a diagram illustrating an example of training and using a machine learning model in connection with predicting network behavior based on weather events.

FIG. 2 is a diagram illustrating an example 200 of training and using a machine learning model (e.g., the optimized-based poisoning model or the statistical-based poisoning model) in connection with predicting network behavior based on weather events. The machine learning model training and usage described herein may be performed using a machine learning system. The machine learning system may include or may be included in a computing device, a server, a cloud computing environment, and/or the like, such as prediction system 115 described in more detail elsewhere herein.

As shown by reference number 205, a machine learning model may be trained using a set of observations. The set of observations (e.g., bandwidth utilizations by network 105, capacity of network 105, transport latencies associated with network 105, packet latencies associated with network 105, packet jitters associated with network 105, and/or the like) may be obtained from historical data, such as data gathered during one or more processes described herein. In some implementations, the machine learning system may receive the set of observations (e.g., as input) from prediction system 115, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from prediction system 115. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of historical network behavior data, a second feature of historical weather data, a third feature of historical action data, and so on. As shown, for a first observation, the first feature may have a value of network behavior 1, the second feature may have a value of weather data 1, the third feature may have a value of action 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is an anticipated network behavior, which has a value of anticipated network behavior 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of network behavior X, a second feature of weather data X, a third feature of action X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict anticipated network behavior X for the target variable of the anticipated network behavior for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a network behavior data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a weather data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to predict network behavior based on weather events. The machine learning system enables recognition and/or identification of tens, hundreds, thousands, or millions of features and/or feature values for tens, hundreds, thousands, or millions of observations, thereby increasing accuracy and consistency and reducing delay associated with predicting network behavior based on weather events relative to requiring computing resources to be allocated for tens, hundreds, or thousands of operators to manually predict network behavior based on weather events.

As indicated above, FIG. 2 is provided as an example. Other examples may differ from what is described in connection with FIG. 2.

Figure 3:
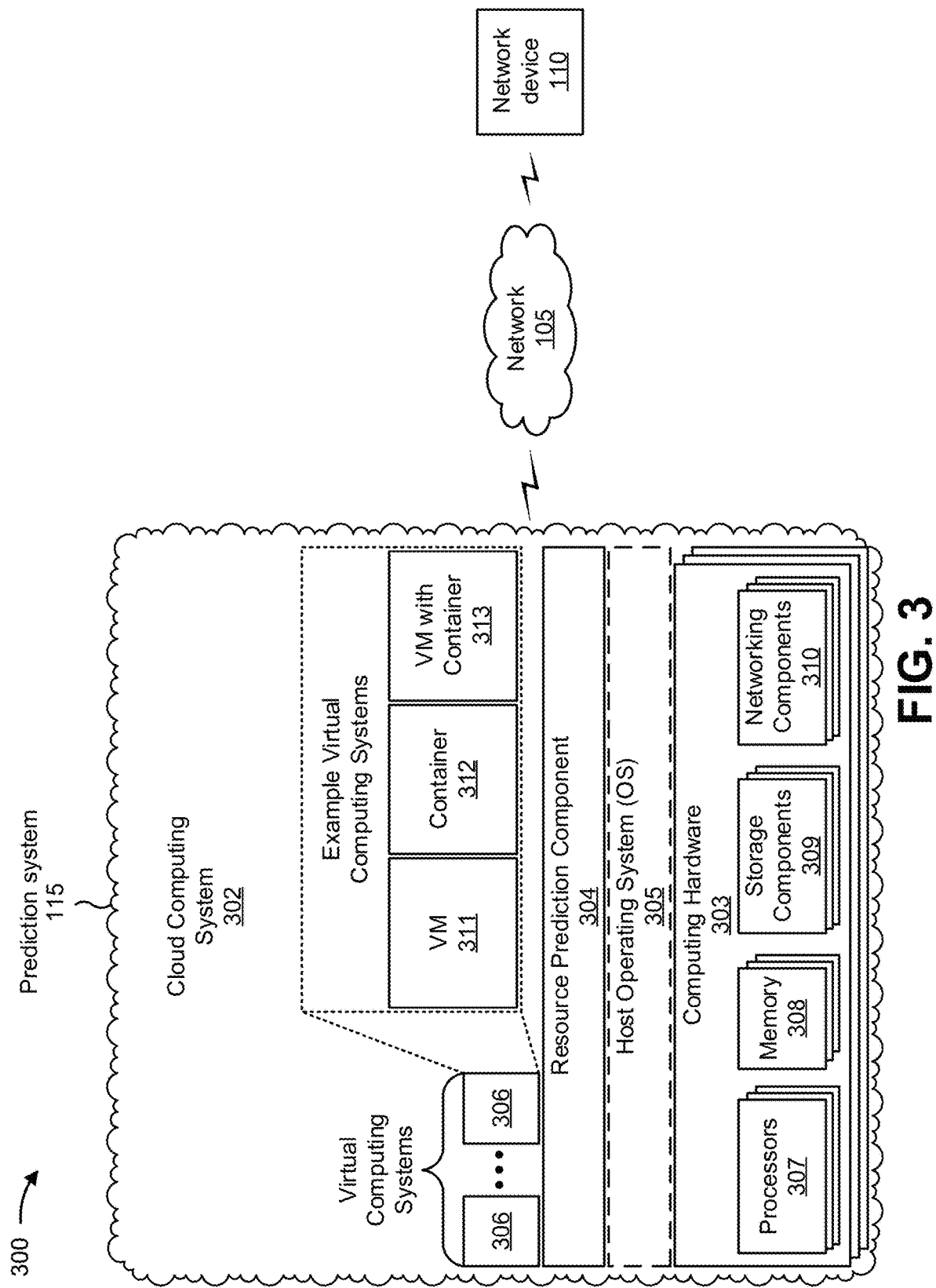
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a prediction system 115, which may include one or more elements of and/or may execute within a cloud computing system 302. The cloud computing system 302 may include one or more elements 303-313, as described in more detail below. As further shown in FIG. 3, environment 300 may include network 105 and/or network device 110. Devices and/or elements of environment 300 may interconnect via wired connections and/or wireless connections.

Network 105 may include a RAN that includes one or more network device 110 that take the form of eNBs, gNBs, and/or the like, via which a user device (e.g., a mobile phone, a laptop computer, a tablet computer, a desktop computer, and/or the like) communicates with a core network. Network 105 may include one or more wired and/or wireless networks. For example, network 105 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 110 includes one or more devices capable of transferring traffic, such as audio, video, text, and/or other traffic, destined for and/or received from a UE. In some implementations, network device 110 may include an eNB associated with an LTE network that receives traffic from and/or sends traffic to a core network. Additionally, or alternatively, network device 110 may include a gNB associated with a RAN of a 5G network. Network device 110 may send traffic to and/or receive traffic from a UE via an air interface, such as a cellular RAT. In some implementations, network device 110 may include a base transceiver station, a radio base station, a base station subsystem, a cellular site, a cellular tower, an access point, a transmit receive point (TRP), a radio access node, a macrocell base station, a microcell base station, a picocell base station, a femtocell base station, a cellular-site router, an aggregation router, a core network device, and other network entities that can support wireless communication. Network device 110 may transfer traffic between UEs (e.g., using a cellular RAT), one or more other network devices 110 (e.g., using a wireless interface or a backhaul interface, such as a wired backhaul interface), and/or a core network. Network device 110 may provide one or more cells that cover geographic areas.

Cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although prediction system 115 may include one or more elements 303-313 of the cloud computing system 302, may execute within the cloud computing system 302, and/or may be hosted within the cloud computing system 302, in some implementations, prediction system 115 may not be cloud-based (e.g., may be implemented outside of a cloud computing system) or may be partially cloud-based. For example, prediction system 115 may include one or more devices that are not part of the cloud computing system 302, such as device 400 of FIG. 4, which may include a stand-alone server or another type of computing device. Prediction system 115 may perform one or more operations and/or processes described in more detail elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
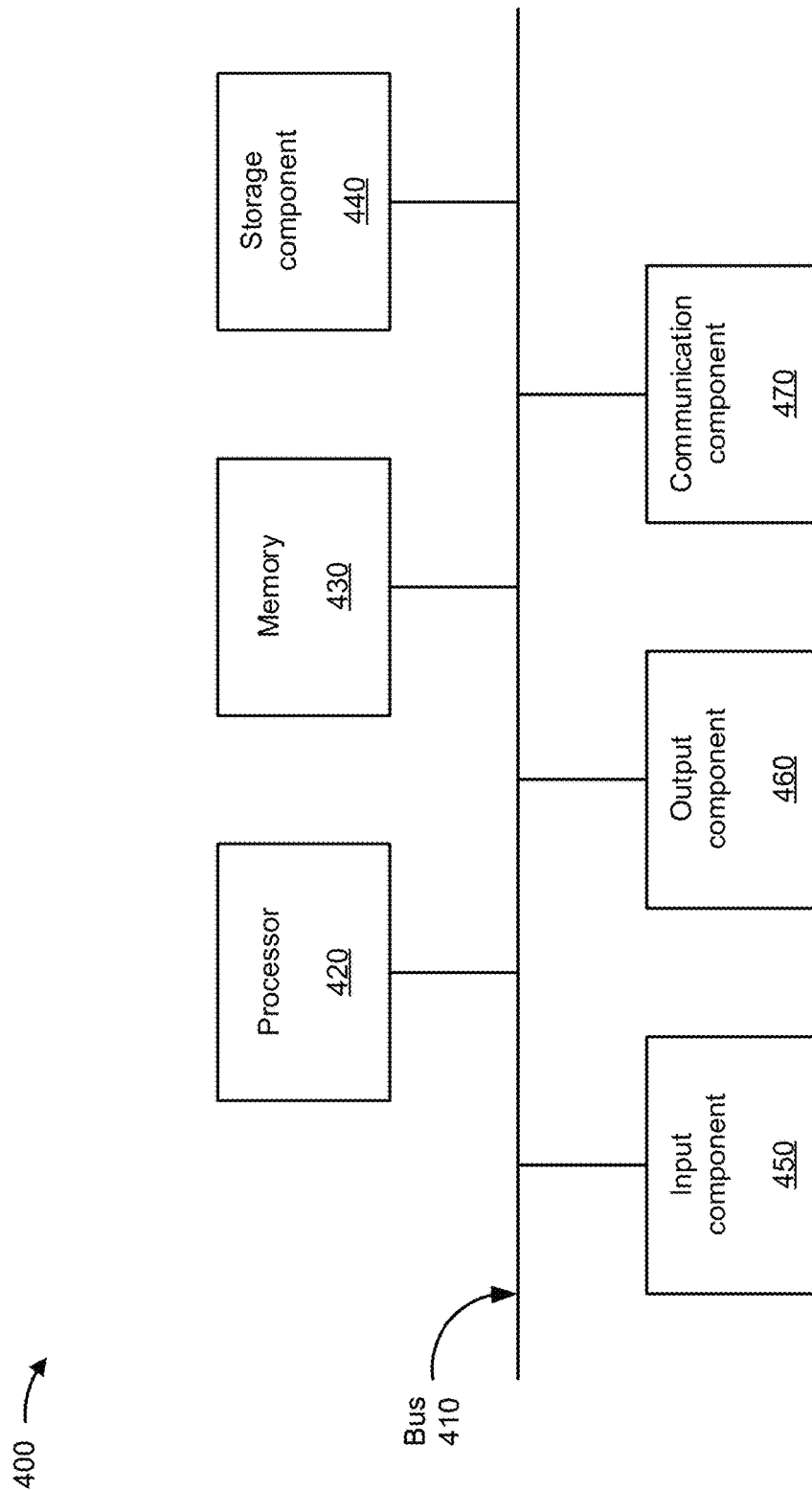
FIG. 4 is a diagram of example components of one or more devices of FIG. 3.

FIG. 4 is a diagram of example components of a device 400, which may correspond to prediction system 115 and/or network device 110. In some implementations, prediction system 115 and/or network device 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
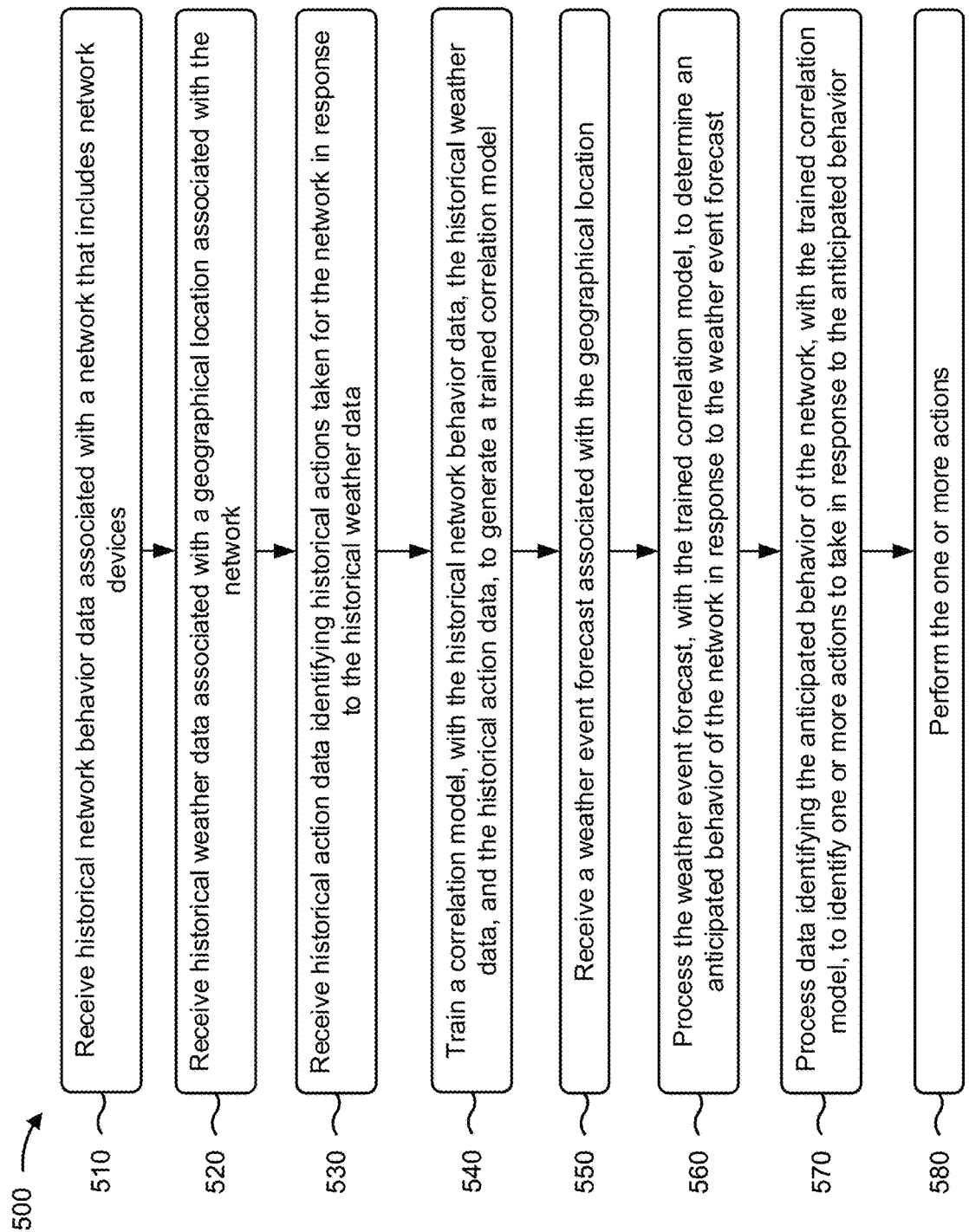
FIG. 5 is a flowchart of an example process for utilizing a machine learning model to predict network behavior based on weather events.

FIG. 5 is a flowchart of an example process 500 associated with utilizing a machine learning model to predict network behavior based on weather events. In some implementations, one or more process blocks of FIG. 4 may be performed by a device (e.g., prediction system 115). In some implementations, one or more process blocks of FIG. 5 may be performed by another device or a group of devices separate from or including the device, such as a network device (e.g., network device 110). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving historical network behavior data associated with a network that includes network devices (block 510). For example, the device may receive historical network behavior data associated with a network that includes network devices, as described above.

As further shown in FIG. 5, process 500 may include receiving historical weather data associated with a geographical location associated with the network (block 520). For example, the device may receive historical weather data associated with a geographical location associated with the network, as described above.

As further shown in FIG. 5, process 500 may include receiving historical action data identifying historical actions taken for the network in response to the historical weather data (block 530). For example, the device may receive historical action data identifying historical actions taken for the network in response to the historical weather data, as described above.

As further shown in FIG. 5, process 500 may include training a correlation model, with the historical network behavior data, the historical weather data, and the historical action data, to generate a trained correlation model (block 540). For example, the device may train a correlation model, with the historical network behavior data, the historical weather data, and the historical action data, to generate a trained correlation model, as described above.

As further shown in FIG. 5, process 500 may include receiving a weather event forecast associated with the geographical location (block 550). For example, the device may receive a weather event forecast associated with the geographical location, as described above.

As further shown in FIG. 5, process 500 may include processing the weather event forecast, with the trained correlation model, to determine an anticipated behavior of the network in response to the weather event forecast (block 560). For example, the device may process the weather event forecast, with the trained correlation model, to determine an anticipated behavior of the network in response to the weather event forecast, as described above.

As further shown in FIG. 5, process 500 may include processing data identifying the anticipated behavior of the network, with the trained correlation model, to identify one or more actions to take in response to the anticipated behavior (block 570). For example, the device may process data identifying the anticipated behavior of the network, with the trained correlation model, to identify one or more actions to take in response to the anticipated behavior, as described above.

As further shown in FIG. 5, process 500 may include performing the one or more actions (block 580). For example, the device may perform the one or more actions, as described above.

Process 500 may include additional implementations, such as any single implementation or any combination of implementations described below and/or in connection with one or more other processes described elsewhere herein.

In a first implementation, the historical network behavior data includes data identifying one or more of bandwidth utilizations by the network, transporting latencies associated with the network, packet latencies associated with the network, or packet jitters associated with the network.

In a second implementation, alone or in combination with the first implementation, the historical weather data includes data identifying one or more of radar associated with the geographical location, winding speeds and directions associated with the geographical location, precipitation amounts associated with the geographical location, lightning strikes associated with the geographical location, or a storm associated with the geographical location.

In a third implementation, alone or in combination with one or more of the first and second implementations, training the correlation model, with the historical network behavior data, the historical weather data, and the historical action data, to generate the trained correlation model includes training the trained correlation model to predict power outages for the geographical location based on the historical weather data; training the trained correlation model to predict anticipated behaviors of the network based on the predicted power outages; and training the trained correlation model to predict responses to the predicted power outages based on the predicted anticipated behaviors of the network.

In a fourth implementation, alone or in combination with one or more of the first through third implementations, the correlation model includes a deep learning model.

In a fifth implementation, alone or in combination with one or more of the first through fourth implementations, processing the weather event forecast, with the trained correlation model, to determine the anticipated behavior of the network in response to the weather event forecast includes determining that the anticipated behavior of the network is associated with a power outage for the geographical location when the anticipated behavior of the network satisfies a threshold and not when the anticipated behavior of the network fails to satisfy the threshold.

In a sixth implementation, alone or in combination with one or more of the first through fifth implementations, processing the weather event forecast, with the trained correlation model, to determine the anticipated behavior of the network in response to the weather event forecast includes determining that the anticipated behavior of the network is associated with a power outage for the geographical location, analyzing network utilization data associated with one or more other networks geographically located proximate to the network; determining an extent of the power outage based on analyzing the network utilization data; and determining the anticipated behavior of the network based on the extent of the power outage.

In a seventh implementation, alone or in combination with one or more of the first through sixth implementations, performing the one or more actions includes one or more of causing one or more additional network devices to be temporarily allocated for the geographical location; causing an autonomous vehicle with a network device to be dispatched to the geographical location; causing a technician to be dispatched to the geographical location; or determining a power outage signature based on the anticipated behavior of the network and utilizing the power outage signature as an alert mechanism.

In an eighth implementation, alone or in combination with one or more of the first through seventh implementations, performing the one or more actions includes generating a notification about the anticipated behavior of the network, and providing the notification to users of the network located in the geographical location.

In a ninth implementation, alone or in combination with one or more of the first through eighth implementations, performing the one or more actions includes determining a network capacity requirement for the network based on the anticipated behavior of the network; determining an upgrade to the network based on the network capacity requirement; and causing the upgrade to the network to be implemented.

In a tenth implementation, alone or in combination with one or more of the first through ninth implementations, performing the one or more actions includes one or more of causing an order to be placed for a new network device of the network based on the anticipated behavior of the network; adjusting one or more parameters of one or more of the network devices based on the anticipated behavior of the network; retraining the correlation model based on the anticipated behavior of the network; or prioritizing select users of the network located in the geographical location and that have paid for latency sensitive services.

In an eleventh implementation, alone or in combination with one or more of the first through tenth implementations, the network devices include one or more of a cellular-site router, an eNodeB, a gNodeB, an aggregation router, or a device for a core network.

In a twelfth implementation, alone or in combination with one or more of the first through eleventh implementations, the historical network behavior data and the historical weather data are associated with a common time period.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, historical network behavior data associated with a network that includes network devices, the historical network behavior data identifying behaviors of the network during power outages;
   receiving, by the device, historical weather data associated with a geographical location associated with the network, the historical weather data identifying weather that causes the power outages;
   receiving, by the device, historical action data identifying historical actions taken for the network in response to the historical weather data;
   training, by the device, a correlation model, with the historical network behavior data, the historical weather data, and the historical action data, to generate a trained correlation model;
   receiving, by the device, a weather event forecast associated with the geographical location;
   processing, by the device, the weather event forecast, with the trained correlation model, to determine whether a power outage is predicted based on the weather event forecast and to determine an anticipated behavior of the network in response to the power outage;
   processing, by the device, data identifying the anticipated behavior of the network, with the trained correlation model, to identify one or more actions to take in response to the anticipated behavior; and
   performing, by the device, the one or more actions.

2. The method of claim 1, wherein the historical network behavior data includes data identifying one or more of:
   bandwidth utilizations by the network,
   transport latencies associated with the network,
   packet latencies associated with the network, or
   packet jitters associated with the network.

3. The method of claim 1, wherein the historical weather data includes data identifying one or more of:
   radar associated with the geographical location,
   wind speeds and directions associated with the geographical location,
   precipitation amounts associated with the geographical location,
   lightning strikes associated with the geographical location, or
   a storm associated with the geographical location.

4. The method of claim 1, wherein training the correlation model, with the historical network behavior data, the historical weather data, and the historical action data, to generate the trained correlation model comprises:
   training the trained correlation model to predict power outages for the geographical location based on the historical weather data;
   training the trained correlation model to predict anticipated behaviors of the network based on the predicted power outages; and
   training the trained correlation model to predict responses to the predicted power outages based on the predicted anticipated behaviors of the network.

5. The method of claim 1, wherein the correlation model includes a deep learning model.

6. The method of claim 1, wherein processing the weather event forecast, with the trained correlation model, to determine the anticipated behavior of the network in response to the weather event forecast comprises:
   determining that the anticipated behavior of the network is associated with the power outage for the geographical location when the anticipated behavior of the network satisfies a threshold and not when the anticipated behavior of the network fails to satisfy the threshold.

7. The method of claim 1, wherein processing the weather event forecast, with the trained correlation model, to determine the anticipated behavior of the network in response to the weather event forecast comprises:
   determining that the anticipated behavior of the network is associated with the power outage for the geographical location;
   analyzing network utilization data associated with one or more other networks geographically located proximate to the network;
   determining an extent of the power outage based on analyzing the network utilization data; and
   determining the anticipated behavior of the network based on the extent of the power outage.

8. A device, comprising:
   one or more processors configured to:

receive a weather event forecast for a geographical location associated with a network that includes network devices;

process the weather event forecast, with a correlation model, to determine an anticipated behavior of the network in response to the weather event forecast, wherein the correlation model has been trained based on:

historical network behavior data associated with the network, the historical network behavior data identifying behaviors of the network during power outages, historical weather data associated with the geographical location, the historical weather data identifying weather that causes the power outages, and historical action data identifying historical actions taken for the network in response to the historical weather data;

process data, with the correlation model, to identify:

whether a power outage is predicted based on the weather event forecast, the anticipated behavior of the network in response to the power outage, and one or more actions to take in response to the anticipated behavior; and perform the one or more actions.

9. The device of claim 8, wherein the one or more processors, when performing the one or more actions, are configured to one or more of:

cause one or more additional network devices to be temporarily allocated for the geographical location;

cause an autonomous vehicle with a network device to be dispatched to the geographical location;

cause a technician to be dispatched to the geographical location; or determine a power outage signature based on the anticipated behavior of the network and utilize the power outage signature as an alert mechanism.

10. The device of claim 8, wherein the one or more processors, when performing the one or more actions, are configured to:

generate a notification about the anticipated behavior of the network; and provide the notification to users of the network located in the geographical location.

11. The device of claim 8, wherein the one or more processors, when performing the one or more actions, are configured to:

determine a network capacity requirement for the network based on the anticipated behavior of the network;

determine an upgrade to the network based on the network capacity requirement; and cause the upgrade to the network to be implemented.

12. The device of claim 8, wherein the one or more processors, when performing the one or more actions, are configured to one or more of:

cause an order to be placed for a new network device of the network based on the anticipated behavior of the network;

adjust one or more parameters of one or more of the network devices based on the anticipated behavior of the network;

retrain the correlation model based on the anticipated behavior of the network; or prioritize select users of the network located in the geographical location and that have paid for latency sensitive services.

13. The device of claim 8, wherein the network devices include one or more of:

a cellular-site router, an eNodeB, a gNodeB, an aggregation router, or a device for a core network.

14. The device of claim 8, wherein the historical network behavior data and the historical weather data are associated with a common time period.

15. A non-transitory computer-readable medium storing a set of instructions, the set of instructions comprising:

one or more instructions that, when executed by one or more processors of a device, cause the device to:

receive historical network behavior data associated with a network that includes network devices, the historical network behavior data identifying behaviors of the network during power outages;

receive historical weather data associated with a geographical location associated with the network, the historical weather data identifying weather that causes the power outages;

train a correlation model, with the historical network behavior data and the historical weather data, to generate a trained correlation model;

receive a weather event forecast associated with the geographical location;

process the weather event forecast, with the trained correlation model, to determine whether a power outage is predicted based on the weather event forecast and to determine an anticipated behavior of the network in response to the power outage; and perform one or more actions in response to the anticipated behavior of the network.

16. The non-transitory computer-readable medium of claim 15, wherein the one or more instructions, that cause the device to train the correlation model, with the historical network behavior data and the historical weather data, to generate the trained correlation model, cause the device to:

train a first correlation model to predict power outages for the geographical location based on the historical weather data; and train a second correlation model to predict anticipated behaviors of the network based on the predicted power outages.

17. The non-transitory computer-readable medium of claim 15, wherein the one or more instructions, that cause the device to process the weather event forecast, with the trained correlation model, to determine the anticipated behavior of the network in response to the weather event forecast, cause the device to:

determine that the anticipated behavior of the network is associated with the power outage for the geographical location when the anticipated behavior of the network satisfies a threshold.

18. The non-transitory computer-readable medium of claim 15, wherein the one or more instructions, that cause the device to perform the one or more actions, cause the device to one or more of:

cause one or more additional network devices to be temporarily allocated for the geographical location;

cause an autonomous vehicle with a network device to be dispatched to the geographical location; or cause a technician to be dispatched to the geographical location.

19. The non-transitory computer-readable medium of claim 15, wherein the one or more instructions, that cause the device to perform the one or more actions, cause the device to:
- determine a network capacity requirement for the network based on the anticipated behavior of the network;
- determine an upgrade to the network based on the network capacity requirement; and
- cause the upgrade to the network to be implemented.

20. The non-transitory computer-readable medium of claim 15, wherein the one or more instructions, that cause the device to perform the one or more actions, cause the device to one or more of:
- cause an order to be placed for a new network device of the network based on the anticipated behavior of the network;
- adjust one or more parameters of one or more of the network devices based on the anticipated behavior of the network; or
- retrain the correlation model based on the anticipated behavior of the network.

* * * * *